United States Patent
Qu et al.

(10) Patent No.: US 9,605,117 B2
(45) Date of Patent: Mar. 28, 2017

(54) METHOD OF BONDING TO FOIL

(71) Applicant: Rohm and Haas Company, Philadelphia, PA (US)

(72) Inventors: Zhaohui Qu, Shanghai (CN); Ling Fan, Shanghai (CN); Mai Chen, Chicago, IL (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 15/029,053

(22) PCT Filed: Oct. 15, 2013

(86) PCT No.: PCT/CN2013/085203
§ 371 (c)(1),
(2) Date: Apr. 13, 2016

(87) PCT Pub. No.: WO2015/054821
PCT Pub. Date: Apr. 23, 2015

(65) Prior Publication Data
US 2016/0257796 A1    Sep. 8, 2016

(51) Int. Cl.
C08J 5/12        (2006.01)
B32B 37/12       (2006.01)
B32B 15/085      (2006.01)
C09J 175/04      (2006.01)
C08G 18/42       (2006.01)
C08G 18/48       (2006.01)
C09J 201/10      (2006.01)
C08G 18/70       (2006.01)
C08G 18/76       (2006.01)
C08G 18/83       (2006.01)
C08G 18/28       (2006.01)
B32B 7/12        (2006.01)
B32B 15/20       (2006.01)

(52) U.S. Cl.
CPC ............... C08J 5/127 (2013.01); B32B 7/12 (2013.01); B32B 15/085 (2013.01); B32B 15/20 (2013.01); B32B 37/12 (2013.01); C08G 18/283 (2013.01); C08G 18/289 (2013.01); C08G 18/42 (2013.01); C08G 18/48 (2013.01); C08G 18/4808 (2013.01); C08G 18/4825 (2013.01); C08G 18/4854 (2013.01); C08G 18/706 (2013.01); C08G 18/7671 (2013.01); C08G 18/837 (2013.01); C09J 175/04 (2013.01); C09J 201/10 (2013.01); B32B 2307/728 (2013.01); B32B 2311/00 (2013.01); C08G 2170/80 (2013.01); C08J 2323/00 (2013.01); C08J 2475/00 (2013.01)

(58) Field of Classification Search
CPC ......... C08J 5/127; C09J 175/04; B32B 37/12; B32B 15/085
See application file for complete search history.

(56) References Cited

U.S. PATENT DOCUMENTS

| | | | |
|---|---|---|---|
| 5,252,696 A | 10/1993 | Laas et al. | |
| 5,861,470 A | 1/1999 | Voss et al. | |
| 5,919,860 A | 7/1999 | Roesler et al. | |
| 6,562,894 B1 | 5/2003 | Blum et al. | |
| 7,414,091 B2 | 8/2008 | Chen et al. | |
| 8,123,899 B2 | 2/2012 | Schumacher et al. | |
| 2006/0183845 A1* | 8/2006 | Harada | C08G 18/0823 524/588 |
| 2009/0194232 A1* | 8/2009 | Schumacher | C08G 18/003 156/329 |
| 2010/0081742 A1 | 4/2010 | Moore | |

FOREIGN PATENT DOCUMENTS

| | | |
|---|---|---|
| CN | 1330681 A | 1/2002 |
| CN | 101146883 A | 3/2008 |
| CN | 102504185 A | 6/2012 |
| CN | 103059258 A | 4/2013 |
| EP | 2103648 A1 | 9/2009 |
| JP | 11-060939 A | 3/1999 |
| JP | 2002256048 A | 9/2002 |
| WO | 9323490 A1 | 11/1993 |

OTHER PUBLICATIONS

MOMENTIVE™ Company, "SILQUEST™ Silanes Selector and Handling Guide", pp. 1-20 (2011).
She, "Study on modified waterborne polyurethane with silane coupling agent as blocking agent", Tech. Ctr. Shanghai, vol. 17, No. 6, pp. 10-14 (2008).
Xiang, et al., "Modification of KH550 on waterborne polyurethane adhesive for laminated composites", College of Material Science and Engineering, pp. 38-41 (2012).
Zhang, et al., "Modification of waterborne polyurethane adhesives with silane coupling agent", j. beijing university, vol. 38, No. 5, pp. 81-85 (2011).

* cited by examiner

*Primary Examiner* — Daniel Lee
(74) *Attorney, Agent, or Firm* — Carl P. Hemenway

(57) ABSTRACT

Provided is a waterborne adhesive composition comprising (i) an aqueous medium; (ii) one or more isocyanate compounds dispersed in said aqueous medium, and (iii) one or more functional silane compounds dispersed in said aqueous medium. Also provided is a method of bonding a metal foil to a polymeric film comprising the steps of (A) applying a layer of the waterborne adhesive composition to a surface of said metal foil, (B) drying said layer of said adhesive composition to produce a layer of dried adhesive, and (C) after said drying, bringing a surface of a polymeric film into contact with said layer of said dried adhesive composition.

10 Claims, No Drawings

METHOD OF BONDING TO FOIL

One important use of adhesive compositions is to bond the layers of a laminate. For example, it is often desired to provide an adhesive composition that can bond a metal foil to a polymer film. It is desirable for reasons of safety and environmental protection that adhesive compositions be waterborne. A desirable method of using a waterborne adhesive composition to bond the layers of a laminate is dry bond laminating process, which is a method in which a layer of the waterborne adhesive composition is applied to a first substrate, then the waterborne adhesive composition is dried or allowed to dry, then a second substrate is brought into contact with the dried adhesive composition, normally via a heated compression nip that mates the two substrates together and forms a laminate.

US 2010/0081742 describes a water based pigmented polyurethane coating which may be used for the coloration of sand grains and other media. The coating described by US 2010/0081742 optionally contains a crosslinker such as, for example, beta-(3,4-epoxycyclohexyl) ethyltriethoxysilane.

It is desired to provide a method of bonding a metal foil to a polymer film using a waterborne adhesive composition. It is especially desired to provide a method of dry bond lamination using a waterborne adhesive composition in which the first substrate is metal foil and the second substrate is a polymer film. Also desired is a waterborne adhesive composition capable of use is such methods.

The following is a statement of the invention.

A first aspect of the present invention is a method of bonding a metal foil to a polymeric film comprising the steps of
(A) applying a layer of a waterborne adhesive composition to a surface of said polymer film or metal foil,
(B) drying said layer of said adhesive composition to produce a layer of dried adhesive, and
(C) after said drying, bringing a surface of a metal foil or polymeric film into contact with said layer of said dried adhesive composition, wherein said waterborne adhesive composition comprises
(i) an aqueous medium
(ii) one or more isocyanate compounds dispersed in said aqueous medium, and
(iii) one or more functional silane compounds dispersed in said aqueous medium.

A second aspect of the present invention is a waterborne adhesive composition comprising
(i) an aqueous medium
(ii) one or more isocyanate compounds dispersed in said aqueous medium, and
(iii) one or more functional silane compounds dispersed in said aqueous medium The following is a detailed description of the invention.

As used herein, the following terms have the designated definitions, unless the context clearly indicates otherwise.

A metal foil is a piece of metal having length and width of at least 1 cm each and having thickness of 0.5 mm or less. A polymeric film is a piece of material made of an organic polymer having length and width of at least 1 cm each and having thickness of 0.5 mm or less.

A composition is said herein to be waterborne if the composition is liquid at 25° C. and contains 30% or more water by weight based on the weight of the composition. A waterborne composition contains a continuous fluid medium in which discreet droplets or particles may optionally be suspended. The continuous fluid medium contains water in the amount, by weight based on the weight of the continuous fluid medium, of 50% or higher. The continuous fluid medium is herein called an aqueous medium.

Compounds other than water that are contained in a waterborne composition are said herein to be dispersed in the aqueous medium. Such compounds may be dissolved or suspended or a combination thereof. Suspended compounds exist as discreet droplets or particles; such particles may contain two or more substances. Suspended droplets or particles have weight-average diameter of 5 nm or more. Compounds that are dissolved in the aqueous medium are dispersed as individual molecules.

An isocyanate is a compound that contains one or more pendant isocyanate group —NCO. An isocyanate that contains more than one isocyanate group per molecule is a polyisocyanate. An isocyanate that contains exactly two isocyanate groups is a diisocyanate. A monomeric diisocyanate has the structure OCN—$R^1$—NCO, where —$R^1$— is a divalent organic group having no isocyanate groups, having no urethane linkages, and having molecular weight of less than 500.

A polyol is a compound having two or more —OH groups per molecule. A diol has exactly two —OH groups per molecule.

As used herein, a colorant is any dye or pigment. Colorants may be organic or inorganic or a combination thereof.

The adhesive composition of the present invention comprises an aqueous medium. Preferably, the amount of water in the aqueous medium, by weight based on the weight of the water, is 70% or more; or 80% or more; or 90% or more.

The adhesive composition of the present invention contains one or more isocyanate compound. Preferably, the adhesive composition contains one or more polyisocyanate. Preferred polyisocyanates are one or more urethane prepolymers, one or more isocyanate trimers, and mixtures thereof.

Isocyanate trimers are trimers of monomeric diisocyanates. Preferred are hydrophilically modified isocyanate trimers, which have the structure

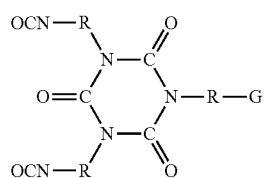

where the three R groups are the same as each other, and where G is an organic group that contains at least one hydrophilic group. Preferred R groups are aliphatic; more preferred are n-hexyl and dimethylcyclohexyl; more preferred is n-hexyl. Preferred hydrophilic groups are anionic groups and hydrophilic alkylene oxide groups; more preferred are hydrophilic alkylene oxide groups. Preferred hydrophilic alkylene oxide groups are —$(CH_2CH_2O)_n$— where n is 3 to 50. Among anionic groups, preferred are sulfate and carboxylate; more preferred is sulfate.

Urethane prepolymers are reaction products of one or more polyisocyanates with one or more polyol or one or more polyamine or a mixture thereof. In making a urethane prepolymer, a molar excess of polyisocyanate is used, and the urethane prepolymer is a polyisocyanate. For making urethane prepolymer, the preferred polyisocyanates are monomeric diisocyanates having molecular weight of 300 or less; more preferably 275 or less. For making urethane prepolymer, the preferred polyisocyanates are aromatic monomeric diisocyanates; more preferred are one or more isomers of MDI; more preferred are 4,4'-MDI and mixtures of 4,4'-MDI with other isomers of MDI; more preferred is 4,4'-MDI. For making the urethane prepolymer, one or more polyisocyanates are preferably reacted with one or more polyol. Preferred polyols have weight-average molecular weight of 500 or higher; more preferably 800 or higher. Preferred polyols have weight-average molecular weight of 5000 or lower; more preferably 2500 or lower. Preferably no polyol having weight-average molecular weight less than 800 is used in making the urethane prepolymer. Preferred polyols are diols. Preferred polyols are polyether polyols, polyester polyols, and mixtures thereof; more preferred are polyether polyols. Preferred polyether polyols are polytetramethylene ether glycol, polypropylene glycol, and mixtures thereof.

Preferred urethane prepolymers are prepared as polyurethane dispersions, which are compositions in which particles of the urethane prepolymer are suspended in an aqueous medium.

The composition of the present invention contains one or more functional silanes. A functional silane is a compound having the structure

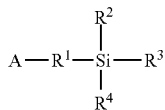

where A is an amino, epoxy, methacryl, vinyl, mercapto, urea, or isocyanate group. The group —$R^1$— is a divalent organic group. Preferably, —$R^1$— is a hydrocarbon group; more preferably an alkyl group; more preferably a linear alkyl group, more preferably a linear alkyl group with 1 to 6 carbon atoms; more preferably a linear alkyl group with 2 to 4 carbon atoms. Each of —$R^2$, —$R^3$, and —$R^4$ is independently either —O—$R^5$ or —$R^6$, where each of —$R^5$ and —$R^6$ is independently an alkyl group; preferably an alkyl group having 1 to 6 carbon atoms; more preferably methyl, ethyl, or isopropyl; more preferably methyl or ethyl. Preferably, one or more of —$R^2$, —$R^3$, and —$R^4$ is —O—$R^5$; more preferably two or more of —$R^2$, —$R^3$, and —$R^4$ is —O—$R^5$. Preferably, two or more of —$R^2$, —$R^3$, and —$R^4$ are identical to each other.

An epoxy group is any group that contains an epoxide ring. Epoxy groups include, for example, epoxyether groups and beta-(3,4-epoxycyclohexyl) groups. An epoxyether group has the structure

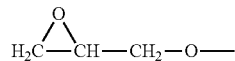

Preferably, A- is an epoxyether, amino, or mercapto group.

Preferably, the functional silane is soluble in water or is suspendable in water. A functional silane is considered herein to be soluble in water if at 25° C. there is one or more value of pH between 1 and 7 at which the amount of functional silane that can be dissolved in water is 2% or more by weight based on the weight of the water. A functional silane is considered herein to be soluble whether or not, in the dissolved form of the functional silane, one or more of the —$OR^5$ groups is converted to an —OH group. A functional silane is considered herein to be suspendable if, at 25° C., 2 grams or more of the functional silane can be suspended in 100 grams of water to form a suspension that does not settle or agglomerate upon storage at 25° C. for 24 hours.

Preferably the waterborne adhesive composition does not contain any colorant. That is, the waterborne adhesive composition either contains no colorant at all or contains colorant in an amount of 0.1% or less by weight based on the total weight of the composition. It is considered herein that if a waterborne adhesive composition contained colorant in an amount of 0.1% or less by weight based on the total weight of the composition, then that composition would contain such a small amount of colorant that the amount of colorant is considered negligible, and the composition is considered to be equivalent to a composition that does not contain any colorant.

The waterborne adhesive composition optionally contains one or more non-urethane polymers. Preferred non-urethane polymers are vinyl polymers, which are polymers that contain polymerized units of ethylenically unsaturated monomers. More preferred non-urethane polymers contain polymerized units of one or more acrylic monomer, one or more vinyl aromatic monomer, or a combination thereof. Acrylic monomers are acrylic acid, methacrylic acid, esters thereof, and amides thereof. Vinyl aromatic monomers include styrene and substituted styrenes.

When one or more non-urethane polymer is present, the preferred form of such polymers is as particles suspended in the aqueous medium.

Preferably, the waterborne adhesive composition does not contain any vinyl polymer that contains any polymerized units of any vinyl silane monomer. A vinyl silane monomer is a monomer that has in its molecule a polymerizable carbon-carbon double bond and one or more silicon atoms.

In the practice of the present invention, a layer of waterborne adhesive composition is preferably applied to a surface of a metal foil or a polymer film. More preferably, a layer of waterborne adhesive composition is applied to a surface of a metal foil. Preferably, the metal foil is aluminum foil. Preferably, the thickness of the metal foil is 1 µm or more; more preferably 3 µm or more. Preferably, the thickness of the metal foil is 25 µm or less; more preferably 15 µm or less.

Preferably the layer of waterborne adhesive composition is dried or allowed to dry to form a layer of dried adhesive composition. Drying may be accomplished by any method, including, for example, one or more of passage of time, applying heat, and exposing to moving air. The layer of adhesive composition is considered to be dried when the amount of water remaining in the layer of adhesive composition is 10% or less by weight, based on the weight of water that was applied as part of the waterborne adhesive composition.

The dried layer of adhesive composition is preferably brought into contact with the surface of a polymer film or a metal foil. More preferably, the dried layer of adhesive composition is brought into contact with the surface of a polymer film. Preferably, the dried layer of adhesive composition is brought into contact with the surface of a polymer film or a metal foil using a heated compression nip that mates the two substrates together and forms a laminate.

Preferred polymers for the polymer film are organic polymers and metalized organic polymers; more preferred are polyolefins, polyolefin copolymers, polyesters, polycarbonates, polyamides, and metalized films thereof. Polyolefins are homopolymers and copolymers of olefin monomers, which are hydrocarbon molecules containing one or more carbon-carbon double bond. Polyolefin copolymers are copolymers of one or more olefin monomer with one or more vinyl acetate, acrylate monomers, and methacrylate monomers. Preferred polymers are polyethylene, polyethylene terephthalate, and nylon; more preferred is polyethylene.

After the polymer film comes into contact with the layer of dried adhesive composition, the composite article thus formed is preferably subjected to mechanical force to press the polymer film and the metal foil towards each other. Such mechanical force is preferably applied by passing the composite article between rollers.

In some embodiments of the present invention, the composite article made of the metal foil, the layer of adhesive composition, and the polymer film is part of a larger composite article that contains further layers. The further layers may contain one or more polymer films, one or more layers of adhesive compositions, and one or more metal foils; any polymer films, adhesive compositions, or metal foils present in the further layers may be the identical to or different from each other and from the polymer film, adhesive composition, and metal foil present in the above-described composite article.

For example, in some embodiments, a larger composite article is made as follows. A first layer of adhesive composition is applied to a polyethylene terephthalate film, and that first adhesive composition is brought into contact with one surface of a metal foil. Then, on the opposite surface of the metal foil, a second layer of adhesive composition is applied, and that second adhesive composition is brought into contact with a surface of a polymer film of polyethylene. Preferably, among such embodiments, both the first layer of adhesive composition and the second layer of adhesive composition are layers of the waterborne adhesive composition of the present invention, and preferably each layer is dried prior to contact with the next substrate.

The following are examples of the present invention.
The following ingredients were used in the examples:

SPU1+Cat F=Adcote™ 545-75EA ("SPU1") plus Catalyst F ("Cat F") is a two-component solventborne adhesive product from Dow Chemical Company Latex "L" is ROBOND™ L-168A, an aqueous latex copolymer from Dow Chemical Company; contains polymerized units of one or more acrylic monomer.

Isocyanate1=ROBOND™ COREACTANT CR3A, water dispersible aliphatic isocyanate trimer from Dow Chemical Company PTMEG1=Tetrathane™ 2000 polytetramethylene ether glycol, MW=2000, from Invista.

PPG1=Varanol™ V 9287A polypropylene glycol, MW=2000 from Dow Chemical Company

PEG1=Carbowax™ PEG1000 polyethylene glycol, molecular weight 1000, from Dow Chemical Company MPEG1=Carbowax™ MPEG 1000 methoxy polyethylene glycol, molecular weight 1000, from Dow Chemical Company MDI=Isonate™ 125M from Dow Chemical Company Surf1=Rhodacal™ DS4 surfactant, sodium dodecylbenzene sulfonate, from Rhodia Foil film is 7 μm aluminium foil supplied by China local supplier Ny is Nylon film, 15 μm thickness PET is polyethylene terephthalate film, 12 μm thickness PE is polyethylene film, 50 μm thickness Silane1=Silquest™ A1100 gamma aminopropyltriethoxysilane, supplied by Momentive Silane2=Silquest™ A189 mercapto-propyltrimethoxysilane supplied by Momentive Silane3=Silquest™ A187 gamma-(2, 3-epoxypropoxy) propyltrimethoxysilane supplied by Momentive DI water is deionized water Ingredients were used in the examples as follows. "Comp." means Comparative, and "Ex." means Example, "Ingr" means Ingredient, and "No." means number.

| Ingr. No. | Ingredient | Ex. 1 | Ex. 2 | Comp. Ex. 10 |
|---|---|---|---|---|
| 1 | PTMEG1 | 89 g | 89 g | 89 g |
| 2 | PPG1 | 105 g | 105 g | 105 g |
| 3 | MPEG1 | 5 g | 5 g | 5 g |
| 4 | PEG1 | 6 g | 6 g | 6 g |
| 5 | MDI | 45 g | 45 g | 45 g |
| 6 | Diaminopropane | 1.7 g | 1.7 g | 1.7 g |
| 7 | Silane1 | 1.8 g | 1.8 g | Zero |
| 8 | DI water | 350 g | 350 g | 350 g |
| 9 | Surfactant1 | 30 g | 30 g | 30 g |
| 10 | Isocyanate1 | zero | 12.67 g | 11.7 g |

To make Example 1 and Example 2 and Comparative Example 10, the ingredients No. 1 through No. 4 were added to a 1-liter glass bottle with nitrogen purge. Then ingredients No. 5 and 7 (if used) were added, and the bottle was slowly heated to approximately 80° C. The bottle was held at 80° C. for 2 to 3 hours; NCO content was checked, and the temperature was maintained until the theoretical value of NCO content was attained. The resulting prepolymer was placed in a plastic bottle and stirred with a Cowles blade at approximately 3000 rpm. Then ingredient No. 9 was added, followed with ingredient No. 8 at cold temperature (5° C.) into plastic jar under high speed stirring to make sure the homogeneous oil-in-water dispersion was achieved, then ingredient No. 6 was added into the dispersion slowly, and stirring was continued to produce a stable dispersion. For Example 2 and Comparative Example 10, the dispersion was subjected to stirring with a magnetic spinning bar while ingredient No. 10 was added dropwise; then stirring was continued for 30 minutes.

| Ingr. No. | Ingredient | Ex. 3 | Ex. 4. | Ex. 5. |
|---|---|---|---|---|
| 1a | Comparative Example 10 | 50 g | 50 g | 50 g |
| 2a | Silane 1 | 0.15 g | Zero | zero |
| 3a | Silane 2 | zero | 0.15 | zero |
| 4a | Silane 3 | zero | Zero | 0.15 |

| Ingr. No. | Ingredient | Ex. 6 | Ex. 7 | Ex. 8 | Comp. Ex. 9 |
|---|---|---|---|---|---|
| 1b | Latex L | 50 g | 50 g | 50 g | 50 g |
| 2b | Silane 1 | 0.15 g | zero | Zero | zero |
| 3b | Silane 2 | zero | 0.15 | zero | zero |
| 4b | Silane 3 | zero | zero | 0.15 | zero |
| 5b | Isocyanate1 | 1 g | 1 g | 1 g | 1 g |

| Ingr. No. | Ingredient | Comp. Ex. 11 |
|---|---|---|
| 1c | SPU1 | 90 g |
| 2c | Cat F | 10 g |

For Examples 3, 4, 5, 6, 7, 8, Comparative 9, and Comparative 11, the ingredients shown above were mixed using a magnetic spinning bar.

For each Example, the adhesive mixture was coated on the first substrate to give dry coating weight of 2.3 g/m², using a K101 control coater (R K PrintCoat Instruments Ltd.). The coated substrate was placed in an oven at 80° C. for 30 sec. to 2 min, to remove the water. A second substrate was brought into contact with the dried adhesive, and a laminate was formed using a hot roll laminator HL-101 (ChemInstruments, Inc.) with a nip temperature of approximately 68° C. Laminated samples were stored for 3-7 at approximately 23° C. and then tested for adhesive strength by two different tests: bond strength and boiling strength.

In the bond strength test, a strip of 15 mm width was cut and then peeled using a tensile tester at 25 cm/min. The peak peel force was recorded and reported in units of Newtons. The failure mode was recorded as follows:
FF: film failure without film elongation (The substrate breaks without elongation)
FT: film tear with tensile elongation (The substrate elongates and also breaks)

In the Boil-in-Bag test, the cured laminates were cut into 8 cm×12 cm size and made into a bag with deionized water inside using HSG-C heat seal machine (Brugger Feinmechanik GmbH) under the condition of 140° C. and 300N/15 mm pressure for 1 second. Avoided splashing water onto heat seal area. Marked any noticeable pre-existing flaws in the heat seal area or laminating area with an indelible marker. Then carefully placed the bags in the boiling water and left there for 30 min, made sure all bags were always immersed in water during the whole boiling process. When completed, recorded the extent of tunneling, delamination or leakage, comparing to the pre-existing flaws. A sample that passed test will show no evidence of tunneling, delamination or leakage beyond any pre-existing heat seal or laminating flaws. Then opened the bag, emptied the bag, and let it cool down, then cut into 15 mm width strip to test the T-peel bonding strength under 25 cm/min speed with Instron™ 5943 machine.

The test results were as follows. "Ex" is Example, "Comp" is Comparative, and "nt" means not tested. Where failure mode is not shown, the failure mode was adhesive failure (the sample failed when the bond between the adhesive on one of the substrates failed, or adhesive split, in which the adhesive layer splits).

Bond Strength (Newtons and Failure Mode)

| first substrate | second substrate | Ex. 1 | Ex. 2 | Ex. 3 | Ex. 4 | Ex. 5 | Comp. Ex. 10 |
|---|---|---|---|---|---|---|---|
| PET | PE | 2.7 | 3.2 FF | 8.5 FF | 3.95 FF | 7.38 FF | 9.21 FF |
| Ny | PE | 3.1 | 10.7 FF | 11.83 FF | 10.32 FF | 11.57 FF | 14.31 FT |
| Foil | PE | 2.2 | 11.7 FF | 3.5 | 3.2 | 2.5 | 1.67 |
| PET | Foil | 1.1 | 1.6 | 2.3 | 1.5 | 1.56 | 1.55 |
| Foil | PET | nt | 4 FF | 4.8 FF | Nt | nt | nt |

Boil-in-Bag (Newtons and Failure Mode)

| first substrate | second substrate | Ex. 1 | Ex. 2 | Ex. 3 | Ex. 4 | Ex. 5 | Comp. Ex. 10 |
|---|---|---|---|---|---|---|---|
| PET | PE | nt | 6 FF | 6.5 FF | Nt | 4.9 FF | 8 FF |
| Ny | PE | nt | 5 | 7.3 | Nt | 8.7 | 12.1 FT |
| Foil | PE | nt | 11 FF | 6.6 | 5 | 3.3 | 2.2 |

Bond Strength (Newtons and Failure Mode)

| first substrate | second substrate | Ex. 6 | Ex. 7 | Ex. 8 | Comp. Ex. 9 | Comp. Ex. 11 |
|---|---|---|---|---|---|---|
| PET | PE | 3.6 FF | 4 FF | 3.4 FF | 3.54 FF | 4.5 FF |
| Ny | PE | 4.7 | 5.3 | 6.6 | 3.28 | 7.8 FF |
| Foil | PE | 4.3 | 3.82 | 4 | 2.6 | 11 |
| PET | Foil | 2.1 | 1.61 | 1.78 | 1.25 | 4.2 FF |
| Foil | PET | 3.4 FF | 3.42 FF | 3.51 | 2.1 | 4 FF |

Boil-in-Bag (Newtons and Failure Mode)

| first substrate | second substrate | Ex. 6 | Ex. 7 | Ex. 8 | Comp. Ex. 9 | Comp. Ex. 11 |
|---|---|---|---|---|---|---|
| PET | PE | 4.5 FF | 3.6 FF | 3.7 FF | 3.4 FF | 3.4 FF |
| Ny | PE | 4.7 | 4.5 | 4.8 | 1.9 | 5 |
| Foil | PE | 4.9 | 4.8 | 4.8 | 2.3 | 6 |

Of special importance are the results for laminates in which the first substrate is foil and the second substrate is PE. The inventive examples all perform better than the waterborne comparative examples. The solventborne comparative example (comp. Ex. 11) was tested to provide information on the capabilities of adhesives that are not waterborne.

For all the other substrates, the inventive examples demonstrated useful level of adhesive strength.

The invention claimed is:
1. A method of bonding a metal foil to a polymeric film comprising the steps of
(A) applying a layer of a waterborne adhesive composition to a surface of said metal foil,
(B) drying said layer of said adhesive composition to produce a layer of dried adhesive, and
(C) after said drying, bringing a surface of a polymeric film into contact with said layer of said dried adhesive composition, wherein said waterborne adhesive composition comprises
(i) an aqueous medium
(ii) one or more isocyanate compounds dispersed in said aqueous medium, wherein said one or more isocyanate compounds comprise one or more hydrophilically modified isocyanate trimers that have the structure

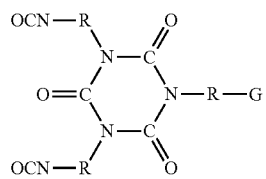

wherein the three R groups are the same as each other, wherein the three R groups are aliphatic, and wherein G is an organic group that contains a hydrophilic group selected from the group consisting of hydrophilic alkylene oxide groups, anionic sulfate groups, and anionic carboxylate groups, and (iii) one or more functional silane compounds dispersed in said aqueous medium.

2. The method of claim 1, wherein said polymeric film is polyolefin.

3. The method of claim 1, wherein said one or more isocyanate compounds comprise one or more urethane prepolymer, wherein said urethane prepolymer comprises the reaction product of 4,4'-MDI with one or more polyol.

4. The method of claim 1, wherein said waterborne adhesive composition additionally comprises one or more non-urethane polymers that comprises polymerized units of one or more acrylic monomers.

5. The method of claim 1, wherein the polymeric film is polyethylene.

6. The method of claim 1, wherein the metal foil is aluminum foil.

7. The method of claim 1, wherein the polymeric film is polyolefin and wherein the metal foil is aluminum foil.

8. The method of claim 1, wherein the polymeric film is polyethylene and wherein the metal foil is aluminum foil.

9. The method of claim 1, wherein G is an organic group comprising —$(CH_2CH_2O)_n$— wherein n is 3 to 50.

10. The method of claim 1, wherein step (C) is performed by a method comprising the use of a heated compression nip.

\* \* \* \* \*